(12) United States Patent
Artini et al.

(10) Patent No.: US 8,010,241 B2
(45) Date of Patent: Aug. 30, 2011

(54) METHOD AND DEVICE FOR ASSISTING IN THE PILOTING OF AN AIRCRAFT FLYING ALONG A PATH WITH RECTILINEAR SEGMENTS

(75) Inventors: Franck Artini, Toulouse (FR); Edward Strongman, Bretx (FR)

(73) Assignee: Airbus, Blagnac (FR)

( * ) Notice: Subject to any disclaimer, the term of this patent is extended or adjusted under 35 U.S.C. 154(b) by 1138 days.

(21) Appl. No.: 11/750,455

(22) Filed: May 18, 2007

(65) Prior Publication Data

US 2008/0065280 A1   Mar. 13, 2008

(30) Foreign Application Priority Data

May 22, 2006  (FR) ..................... 06 04543

(51) Int. Cl.
*G06F 17/00* (2006.01)
(52) U.S. Cl. ........................... 701/3; 340/961
(58) Field of Classification Search .................. 701/3, 4, 701/9, 14, 301; 244/177, 183, 184, 194, 244/195, 76 R; 340/961, 963, 968, 970
See application file for complete search history.

(56) References Cited

U.S. PATENT DOCUMENTS

| | | | |
|---|---|---|---|
| 3,784,969 A | 1/1974 | Wilckens et al. | |
| 3,980,258 A * | 9/1976 | Simeon | 244/182 |
| 5,289,185 A | 2/1994 | Ramier et al. | |
| 6,347,263 B1 * | 2/2002 | Johnson et al. | 701/14 |
| 7,064,680 B2 * | 6/2006 | Reynolds et al. | 340/961 |

FOREIGN PATENT DOCUMENTS

| EP | 1 462 767 | 9/2004 |
|---|---|---|
| EP | 1 603 098 | 12/2005 |

OTHER PUBLICATIONS

Preliminary Search Report dated Dec. 14, 2006.
Preliminary Search Report dated Dec. 14, 2006.

* cited by examiner

*Primary Examiner* — Dalena Tran
(74) *Attorney, Agent, or Firm* — Dickinson Wright PLLC

(57) ABSTRACT

A method and device that determine characteristic angles, each characteristic angle representing the angle by which a rectilinear segment of the flight path is seen from the aircraft. A head-up screen displays characteristic signs that are representative of the characteristic angles.

13 Claims, 7 Drawing Sheets

METHOD AND DEVICE FOR ASSISTING IN THE PILOTING OF AN AIRCRAFT FLYING ALONG A PATH WITH RECTILINEAR SEGMENTS

FIELD OF THE INVENTION

The present invention relates to a method and a device for assisting in the piloting of an aircraft, in particular an airplane, in a flight of the aircraft along a flight path comprising a plurality of successive rectilinear segments. Each of said rectilinear segments presents a particular constant gradient, and the gradients are different from one (rectilinear) segment to another.

The present invention applies more particularly, but not exclusively, to:
- the approach to a landing area, which takes place at steep gradient to a certain height above the strip, then with a progressive reduction of the gradient until the wheels touch down on the ground; or
- a flight at low altitude along a flight path calculated on board the aircraft, which comprises a succession of rectilinear segments.

The main object of the present invention is to enable the pilot of the aircraft to anticipate the next gradient (or the next rectilinear segment) to be flown, and this whether flying automatically or manually.

In the case of the approach to a landing strip, automatic aircraft guidance systems are used to bring the latter almost to the landing strip, whatever the visibility conditions, provided that the certification level of the aircraft and of an onboard landing aid system, and the level of qualification of the crew, permit it. This is normally possible for gradients relative to a usual instrument landing system (ILS) which are generally of the order of 3'.

However, in the case of operations requiring a steep-gradient approach, such an automatic landing is much more difficult. The aircraft is then guided in automatic flight mode to a certain decision height above the strip, the height below which the pilot must see the landing strip (otherwise a go-around must be performed). He then performs the landing manually in visual mode, or he monitors an automatic landing, being ready at all times to take over the flight controls to continue in manual flight mode if that proves necessary.

BACKGROUND OF THE RELATED ART

Furthermore, a steep-gradient approach can make it necessary to use airbrakes and/or spoilers, which increase the approach speed. In such a situation, the aircraft must decelerate between the steep-gradient segment and the threshold of the strip. In practice, the greater the speed is when the wheels touch down, the greater is the length needed to perform the landing. Now, the length of a strip that can be used for the landing is predetermined and limited. In the case of manual piloting, the pilot must therefore, in such a situation, have the aircraft decelerate by successive breaks of the gradient, while progressively retracting the airbrakes and/or the spoilers manually. These breaks of gradient constitute a succession of rectilinear segments, each time presenting a constant pitch-down gradient, gradients that progressively decrease until the landing, that is, until a final gradient normally of the order of 3'. It is therefore necessary, in such a situation, to provide the pilot with the appropriate information enabling him to correctly perform this difficult maneuver.

Moreover, in a flight at low altitude along a flight path consisting of a succession of rectilinear segments with constant pitch-down or pull-up gradients, in particular when the flight is performed by following a flight director system, the pilot needs to anticipate the various changes of gradient, in order to follow the flight path as effectively as possible, and therefore to keep a sufficient safety margin relative to the ground. In such a situation, there is also an interest in being able to provide the pilot with appropriate information, enabling him to follow the path as effectively as possible.

The present invention relates to a method for assisting in the piloting of an aircraft in a flight along a flight path comprising a plurality of successive rectilinear segments, which makes it possible to provide the pilot of the aircraft with the information needed to pilot said aircraft in said flight.

To this end, according to the invention, said method, whereby there is presented, on a display screen of a head-up display device, superimposed on the environment seen at the front of the aircraft and in conformal projection, a gradient scale and, on this gradient scale, a gradient symbol illustrating the current gradient of the aircraft, is noteworthy in that the following series of successive steps is carried out automatically and repetitively:

a) the respective gradients of a plurality of successive rectilinear segments of said flight path are determined, as is change information that makes it possible to determine changes of gradient (that is, changes of rectilinear segment);

b) from said gradients and from said change information, for each of said rectilinear segments, a characteristic angle is determined which represents the gradient angle by which the corresponding rectilinear segment is seen by the pilot of the aircraft, from the current position of said aircraft, and c) there are presented, on said display screen of the head-up display device, superimposed on the environment seen at the front of the aircraft and in conformal projection, characteristic signs which respectively depend on said characteristic angles and which are positioned on the gradient scale so as to display differences in gradient relative to said gradient symbol (illustrating the current ground gradient), each duly displayed difference in gradient presenting on the gradient scale a gradient that is equal to the corresponding characteristic angle determined in the step b).

SUMMARY OF THE INVENTION

Thus, with the invention, the pilot of the aircraft is provided with the differences in gradient which give him an indication as to the respective gradients of the next rectilinear segments along which the aircraft must fly.

Furthermore, according to the invention, the corresponding presentation of characteristic signs is performed on a head-up display device, which avoids the pilot having to lower his gaze in the cockpit and therefore facilitates the piloting of the aircraft.

In the context of the present invention, the expression "conformal projection" relating to the head-up display device means that the angular representation of a particular gradient actually corresponds to the gradient displayed on the gradient scale, that is, that the point of the ground that such a gradient indicates actually corresponds to the point on the ground that the aircraft would reach if it were to follow this gradient.

Advantageously, in the step a), said gradients are determined at least using a performance model, which makes it possible in particular to take into account the possibilities of deceleration of the aircraft (in approach) or of descent or climb (in flight at low altitude).

Furthermore, advantageously, there is determined, automatically and repetitively, a difference in gradient between an auxiliary gradient corresponding to the gradient on which the aircraft is relative to the next change of gradient and a set-point gradient corresponding to the gradient of the rectilinear segment along which the aircraft should fly (at the current instant), and this difference in gradient is taken into account for determining said characteristic angles. This makes it possible to take account of the fact that the aircraft does not necessarily fly along a gradient which is exactly equal to the set-point gradient along which it should fly.

Moreover, advantageously, there is determined, automatically and repetitively, information on the distance (real distance, or information expressed in flight time) between the current position of the aircraft and the position of the next change of gradient, and, in the step c), there is presented, on said display screen, a particular indication means indicating this information. This enables the pilot to anticipate the next change of gradient (that is, the next change of rectilinear segment).

Moreover, to facilitate the piloting of the aircraft, there is determined, automatically and repetitively, a set-point gradient of the aircraft (along which said aircraft should fly), and, in the step c), there is presented, on said display screen, an auxiliary symbol which is positioned on said gradient scale at said set-point gradient. Consequently, in manual mode, it is sufficient for the pilot to pilot the aircraft in such a way as to bring said gradient symbol (illustrating the current gradient of the aircraft) to said auxiliary symbol to achieve a piloting compliant with the flight set-points.

In a first embodiment, said flight path is a steep-gradient approach path with a view to landing on a landing strip, and said rectilinear segments represent all the successive segments of the flight path, starting from a predetermined height, and this to said landing strip. Preferably, in this case, said change information corresponds respectively to the heights relative to the ground at which the different changes of gradient (or changes of rectilinear segment) must be made.

In a preferred implementation, for a flight path comprising two successive rectilinear segments SA and SB of respective lengths aA and aB and respective gradients θA and θB and change of gradient heights hA, hB and hC, there is determined, in the step b), the characteristic angle α (which represents the gradient angle by which the rectilinear segment SB is seen from the aircraft located at the height hA at the start of the rectilinear segment SA) from the following expression:

$$aB^2 = aA^2 + aC^2 - 2aAaC\cos\alpha$$

which, itself, is obtained from the following expressions:

$$\begin{cases} aA = (hA - hB)/\sin\theta A \\ aB = (hB - hC)/\sin\theta B \\ aC^2 = aA^2 + aB^2 - 2aAaB\cos\beta \\ \beta = \pi - \theta A + \theta B \end{cases}$$

Moreover, in a second embodiment, said flight path is a low-altitude flight path, and said rectilinear segments are all the successive segments of said flight path, which are located in front of the aircraft, and this to a particular distance relative to the current position of the aircraft. This particular distance can correspond to the distance traveled by the aircraft at the current speed for a predetermined flight time, for example for one minute of flight.

The present invention also relates to a device for assisting in the piloting of an aircraft in a flight along a flight path comprising a plurality of successive rectilinear segments, each of said rectilinear segments presenting a particular constant gradient and the gradients being different from one segment to another.

According to the invention, said device of the type comprising:
  a set of information sources;
  a computation unit which is linked to said set of information sources; and
  a head-up display device, which is linked to said computation unit and which is designed to present, on a display screen, superimposed on the environment seen at the front of the aircraft and in conformal projection, a gradient scale and, on this gradient scale, a gradient symbol illustrating the current gradient of the aircraft,
is noteworthy in that:
  said device also comprises:
    first means for determining, automatically and repetitively, the respective gradients of a plurality of successive rectilinear segments of said flight path, and change information that makes it possible to determine changes of gradient (that is, changes of rectilinear segment); and
    second means for determining, automatically and repetitively, from said gradients and from said change information, for each of said rectilinear segments, a characteristic angle which represents the gradient angle by which the corresponding rectilinear segment is seen by the pilot of the aircraft, from the current position of said aircraft; and
  said head-up display device is designed to present on said display screen, superimposed on the environment seen at the front of the aircraft and in conformal projection, characteristic signs which respectively depend on said characteristic angles and which are positioned on the gradient scale so as to display differences in gradient relative to said gradient symbol, each duly displayed difference in gradient presenting on the gradient scale a gradient that is equal to the corresponding characteristic angle determined by said second means.

BRIEF DESCRIPTION OF THE DRAWINGS

The figures of the appended drawing will clearly show how the invention can be implemented. In these figures, identical references designate similar elements.

DETAILED DESCRIPTION OF THE INVENTION

Figure 1:
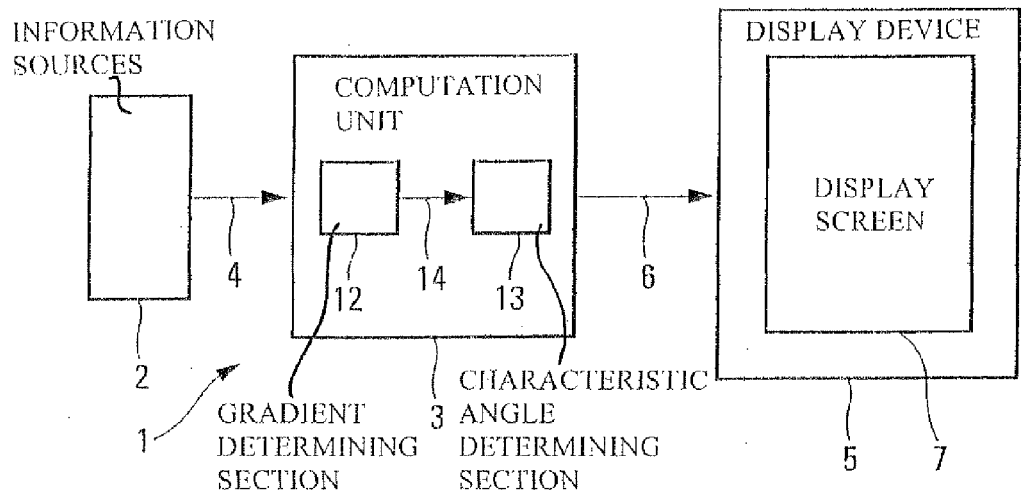
FIG. 1 is the block diagram of a device according to the invention.

The device 1 according to the invention and diagrammatically represented in FIG. 1 is intended to assist in the piloting of an aircraft A, in particular of a transport airplane (military or civilian), in a flight along a flight path TV1, TV2 comprising a plurality of successive rectilinear segments Si. Each of said rectilinear segments Si presents a particular constant gradient θi (relative to the horizontal H), and the gradients are different from one rectilinear segment Si to another.

In a known way, said device 1 is on board the aircraft A and comprises:
- a set 2 of usual information sources;
- a computation unit 3 which is linked via a link 4 to said set 2 of information sources; and
- a display device 5 of the head-up type, which is linked via a link 6 to said computation unit 3 and which is designed in such a way as to present, on a display screen 7, superimposed on the environment seen at the front of the aircraft A and in conformal projection, a gradient scale 8 and, on this gradient scale 8, a gradient symbol 9 illustrating the current ground gradient of the aircraft A, as represented for example in FIGS. 6 to 9. The current ground gradient θ of the aircraft A corresponds to the angle between the horizontal H and the ground speed vector V of the aircraft A, as shown, for example, in FIG. 2. It will be noted that all the gradients concerned are ground gradients.

Figure 2:
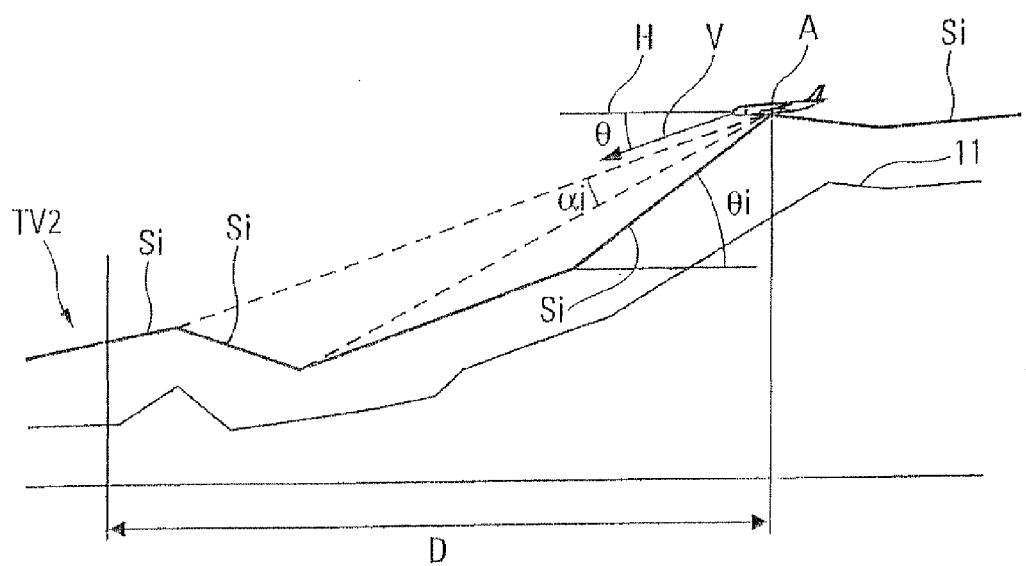
FIGS. 2 and 3 illustrate two different flight types, for which devices according to the invention can be used.

In a first possible application represented in FIG. 2, the device 1 according to the invention is designed to assist the pilot of an aircraft A flying along a flight path TV2 at low altitude. This flight path TV2 is made up of a succession of rectilinear segments Si with different pitch-down or pull-up gradients. Such a flight path TV2 makes it possible, in a usual manner, for the aircraft A to follow the terrain 11 being flown over as closely as possible, in particular to avoid being detected. Such a flight path TV2 at low altitude is normally located at a predetermined height, for example at 500 feet (approximately 150 meters), relative to said terrain 11.

Figure 3:
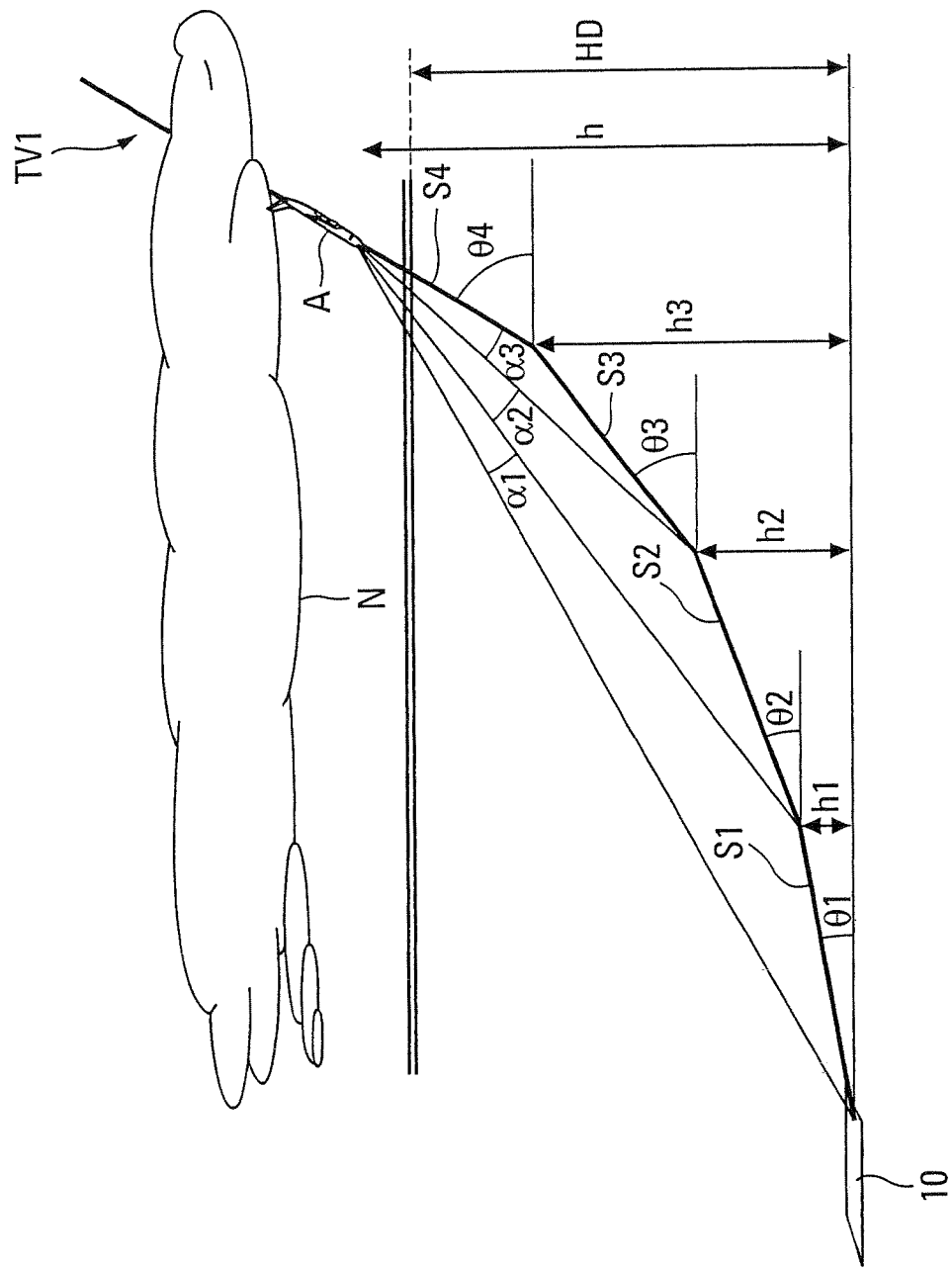

Furthermore, in another application represented in FIG. 3, said device 1 is intended to assist the pilot of an aircraft A in the approach to a landing strip 10 along a flight path TV1 comprising rectilinear segments S1, S2, S3 and S4 and initially (segment S4) presenting a steep gradient θ4, for example a gradient greater than or equal to 10°. Such an approach is performed at steep gradient to a predetermined height above the strip 10, then with a progressive reduction of the gradient (θ4, θ3, θ2, θ1) until the wheels of the aircraft A touch down on the strip 10. In this case, the aircraft A is guided in automatic flight mode to a certain height above the landing strip 10, which is greater than a predetermined decision height HD, a height which should at worst be located under the clouds N and below which the pilot should see the landing strip 10. The pilot then performs a landing manually in visual mode, or he monitors an automatic landing, being ready at all times to take over the flight controls to continue in manual flight mode if this proves necessary.

Furthermore, it is known that such a steep-gradient approach can require the use of airbrakes and/or spoilers, which increases the approach speed. In such a situation, the aircraft A must decelerate between the steep-gradient segment S4 and the threshold of the strip 10. In practice, the greater the speed is when the wheels touch down, the greater is the length required to perform the landing. Now, the length of a strip 10 that can be used for the landing is predetermined and limited. In a manual piloting case, the pilot must therefore, in such a situation, have the aircraft A decelerate by successive breaks of the gradient, while progressively retracting the airbrakes and/or the spoilers manually. These breaks of gradient form the succession of rectilinear segments S1 to S4 of FIG. 3, which, each time, present a constant pitch-down gradient, gradients θ4 to θ1 which progressively decrease until the landing, that is, until a final gradient θ1 generally of the order of 3'.

In the description below of the invention, the device 1 is applied more particularly to a steep-gradient approach, as is represented in FIG. 3. However, the implementation of the invention in a flight at low altitude, as represented in FIG. 2, is quite similar.

According to the invention, in order in particular to provide the pilot of the aircraft A with information enabling him to anticipate the abovementioned changes of gradient:
- said device 1 comprises, in addition to the means 2, 3 and 5 described above:
  - means 12 for determining, automatically and repetitively, the respective gradients θi of a plurality i of successive rectilinear segments Si of said flight path TV1, TV2, and change information specified below, making it possible to determine changes of gradient; and
  - means 13 which are linked via a link 14 to said means 12 and which are designed in such a way as to determine, automatically and repetitively, from the gradients and from the change information received from said means 12, for each of said rectilinear segments Si, a characteristic angle αi which represents the gradient angle by which the corresponding rectilinear segment Si is seen by the pilot of the aircraft A, from the current position of said aircraft A; and
- said display device 5 of the head-up type is designed in such a way as to present on said display screen 7, superimposed on the environment seen at the front of the aircraft A and in conformal projection, characteristic signs Ci which are respectively representative of said characteristic angles αi and which are positioned on the gradient scale 8 so as to display differences Ei in gradient relative to said gradient symbol 9, as represented in FIGS. 6 to 9 in particular. Each duly displayed difference Ei in gradient (between a characteristic sign Ei and said gradient symbol 9) presents on the gradient scale 8 a gradient that is equal to the value of the corresponding characteristic angle αi determined by said means 13.

In one particular embodiment, said head-up-type display screen 7 can be implemented in the form of a primary flight display (PFD) type screen and can in addition, in a usual way, present in particular a speed scale 16 and a heading scale 17 such as are represented in particular in FIGS. 6 to 9, and, for example, an altitude scale not shown.

Furthermore, in a preferred embodiment, said means 12 and 13 are part of said computation unit 3.

The device 1 according to the invention therefore provides the pilot of the aircraft A with gradient differences Ei which give him an indication as to the respective gradients of the next rectilinear segments Si along which the aircraft A must fly.

Furthermore, according to the invention, the corresponding presentation of characteristic signs Ci is performed on a head-up display device 5, which avoids the pilot having to lower his gaze in the cockpit and therefore facilitates the piloting of the aircraft A. In the context of the present invention, the expression "conformal projection" relative to the head-up display device 5 means that the angular representation of a particular gradient actually corresponds to the gradient displayed on the gradient scale 8, that is, that the point on the ground that such a gradient indicates actually corresponds to the point on the ground that the aircraft A would reach if it were to follow this gradient. The signs Ci give the angles αi.

It will be noted that, in the application of FIG. 2 relating to a flight path TV2 at low altitude, the rectilinear segments Si taken into account by said means 12 and 13 are all the successive segments of said flight path TV2, which are located in front of the aircraft A, and this to a particular distance D relative to the current position of the aircraft A.

This particular distance D can correspond to the distance traveled by the aircraft A at the current speed for a predetermined flight time, for example for one minute of flight.

Furthermore, in the application of FIG. 3, the flight path TV1 is a path that should enable the aircraft A to touch down on the landing strip 10 at the required speed, with a required gradient θ1, after a required deceleration. In this case, said means 12 calculate the gradients θi and the heights hi relative to the ground at which the changes of gradient (or of rectilinear segment) must be performed, and this as far as the landing.

Said means 12 determine these gradients using a performance model. The latter characterizes the deceleration possibilities of the aircraft A between the initial gradient θ4 (gradient of the latest rectilinear segment S4 of the flight plan obtained from a flight management system (FMS), ending at the decision height HD) and the final gradient θ1 (generally of the order of 3°, which corresponds to a normal final approach gradient).

Said performance model takes into account, if necessary, the effect of the air brakes and/or the spoilers and, where appropriate, gives the progressive retraction height or heights of said air brakes and/or spoilers. Furthermore, the initial and final aerodynamic configurations (landing gear, flaps), and the initial and final speeds, which are obtained from the flight plan, are also computation parameters used by said means 12.

Figure 4:
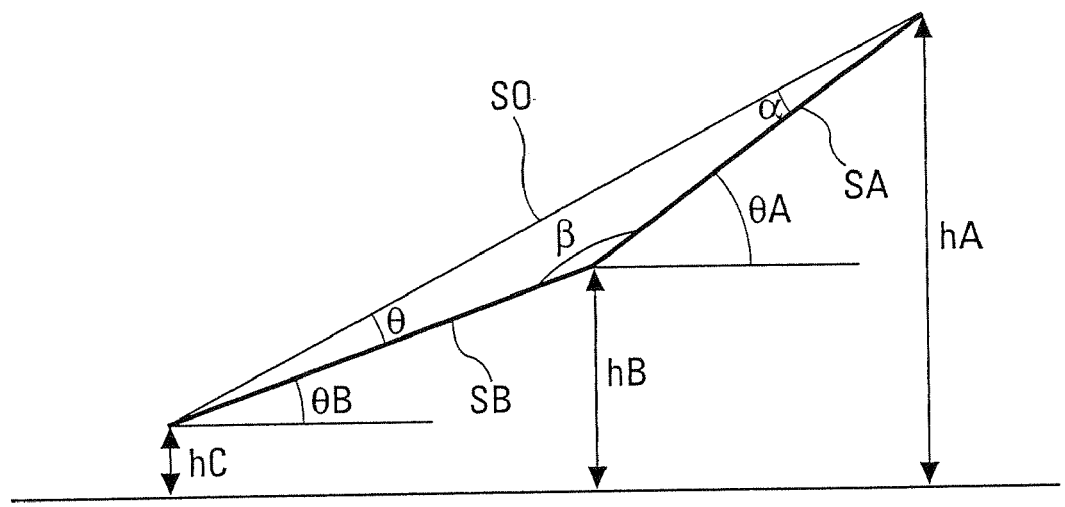
FIGS. 4 and 5 are graphs for explaining calculations applied in the context of the present invention.

FIG. 4 is a graph for explaining the method of calculating the characteristic angles αi. For a flight path comprising two successive rectilinear segments SA and SB of respective lengths aA and aB and respective gradients θA and GB and gradient change heights hA, hB and hC, the means 13 calculate a characteristic angle α which represents the gradient angle by which the rectilinear segment SB is seen from the aircraft A located at the height hA at the start of the rectilinear segment SA. More simply, α represents the opening angle between the segment SA and a segment SO (of length aC). Said means 13 then calculate the characteristic angle α, using the following expression:

$$aB^2 = aA^2 + aC^2 - 2aAaC\cos\alpha$$

which is obtained from the following expressions:

$$aA = (hA\ hB)/\sin\theta A$$

$$aB = (hB\ hC)/\sin\theta B$$

$$aC^2 = aA^2 + aB^2 2aAaB\cos\beta$$

$$\beta = \pi\ \theta A + \theta B$$

Figure 6:
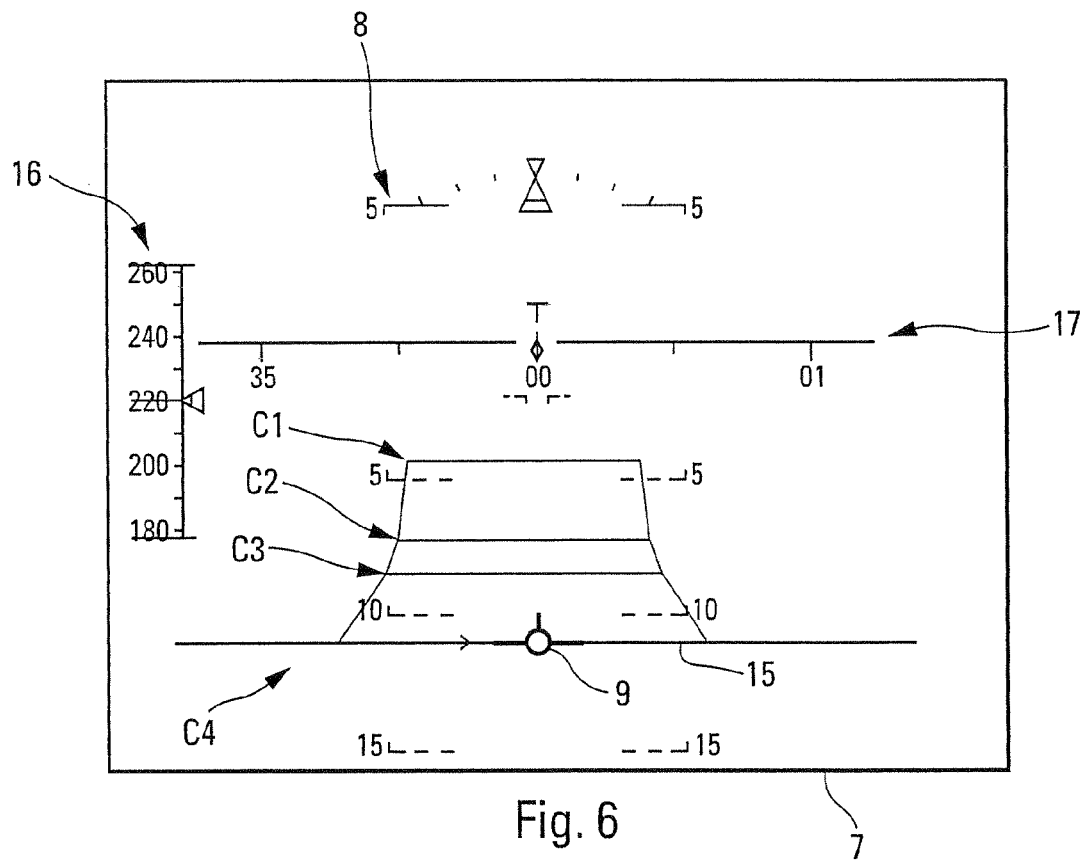
FIGS. 6 to 9 diagrammatically illustrate a head-up display screen showing indications presented respectively in accordance with variants of embodiment of the invention.

It will be noted that the different characteristic angles α1, α2, α3, α4 (FIG. 3) are calculated according to the same principle by said means 13. Thus, when the height h of the aircraft A is greater than h3, θ4 represents the ground gradient of the path to be followed, whereas α3 represents the angle by which the segment S3 of gradient θ3 is seen by the pilot of the aircraft A. In the example of FIG. 3, the aircraft A exactly follows the ground gradient θ4 over the rectilinear segment S4. When the height h of the aircraft A decreases, the characteristic angle α3 decreases to zero when the height h of the aircraft A is h3. This same process is repeated for α1 and α2. The display provided for such a situation is represented in FIG. 6, for which the aircraft A is on the flight path TV1 and presents a gradient corresponding to the set-point gradient θ4. In this case, the symbol 9 is displayed level with an auxiliary symbol 15 specified below. The characteristic sign C4 comprises this auxiliary symbol 15 illustrating the gradient, and lines 19 and 20, also specified below, which show the relative position of the aircraft A.

Figure 5:
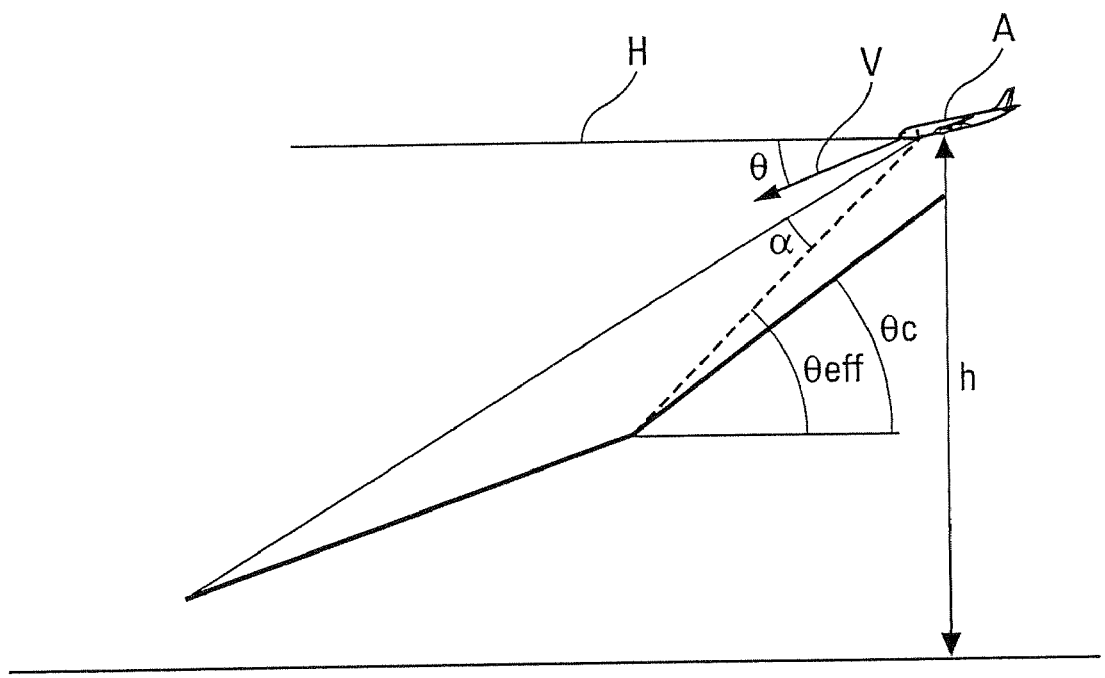

However, the aircraft A does not always necessarily present the desired gradient, that is, the current gradient of the aircraft A can be different from the precalculated gradient corresponding to the gradient of the rectilinear segment on which the aircraft A is or should be. In this case (which is represented in FIG. 5), the characteristic angle α is no longer calculated by taking into account the set-point gradient θc, but a gradient θeff which is the gradient on which the aircraft A is relative to the next change of gradient. In this case, said set 2 of information sources or said computation unit 3 comprises a computation means not shown with which to calculate the differences between the current position of the aircraft A and the prescribed flight path TV1. Thus, the position of the aircraft A and its gradient are taken into account.

Figure 7:
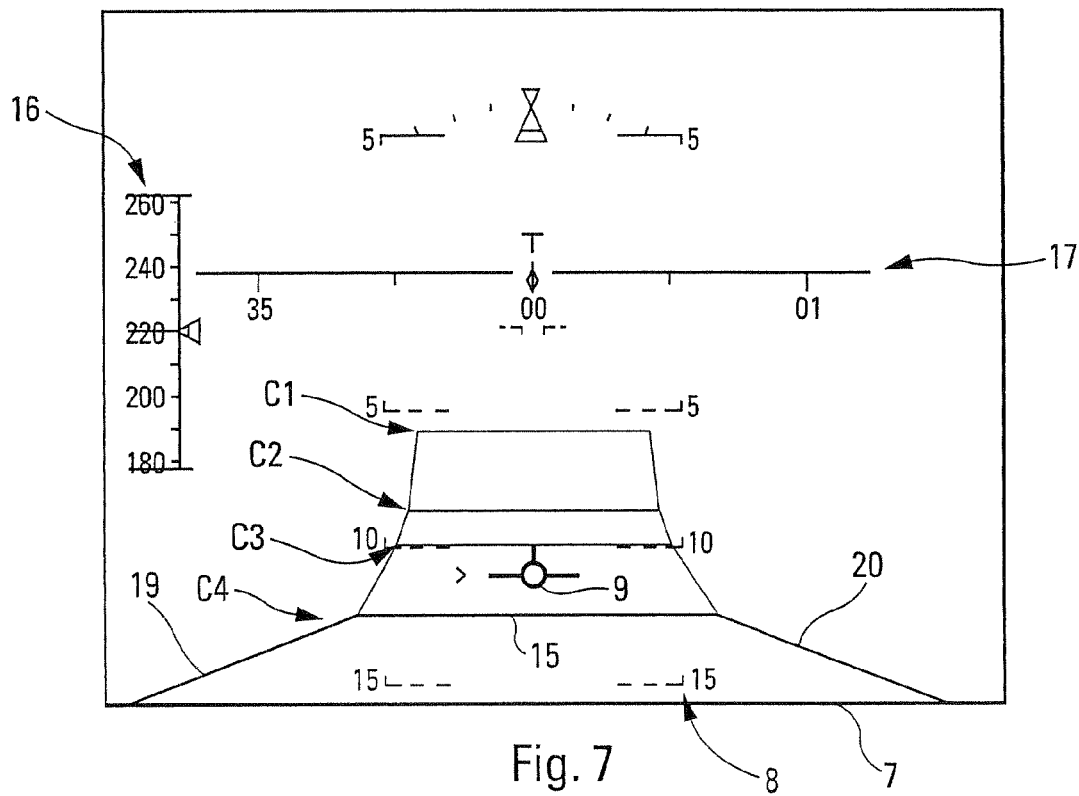
Figure 8:
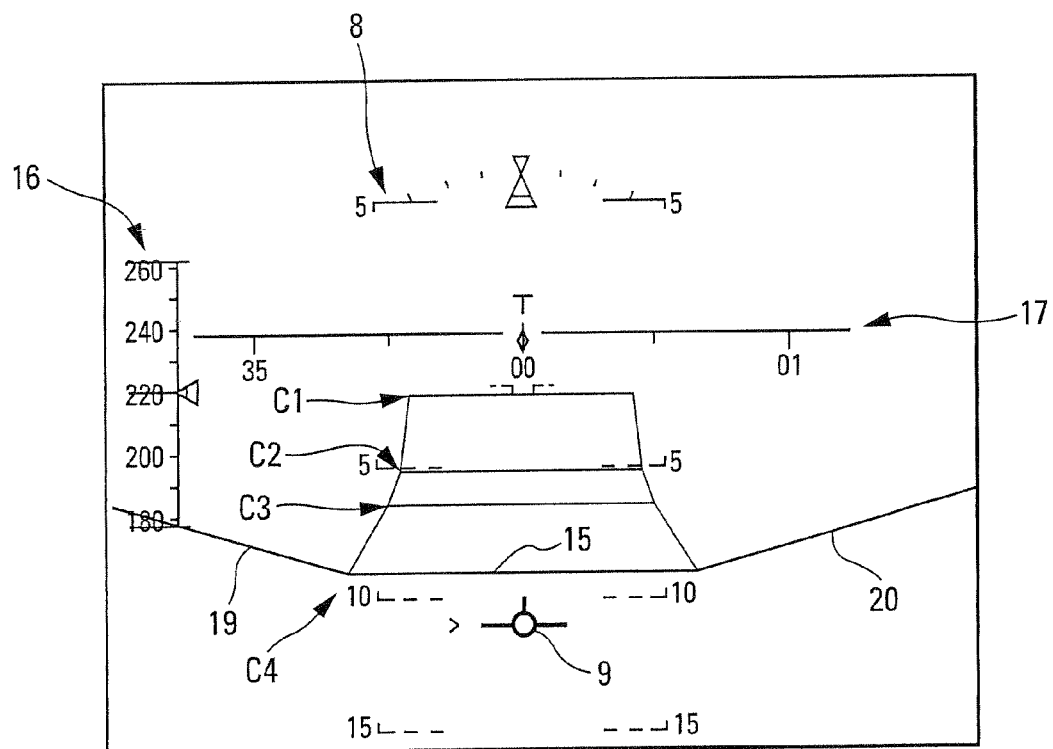
Figure 9:
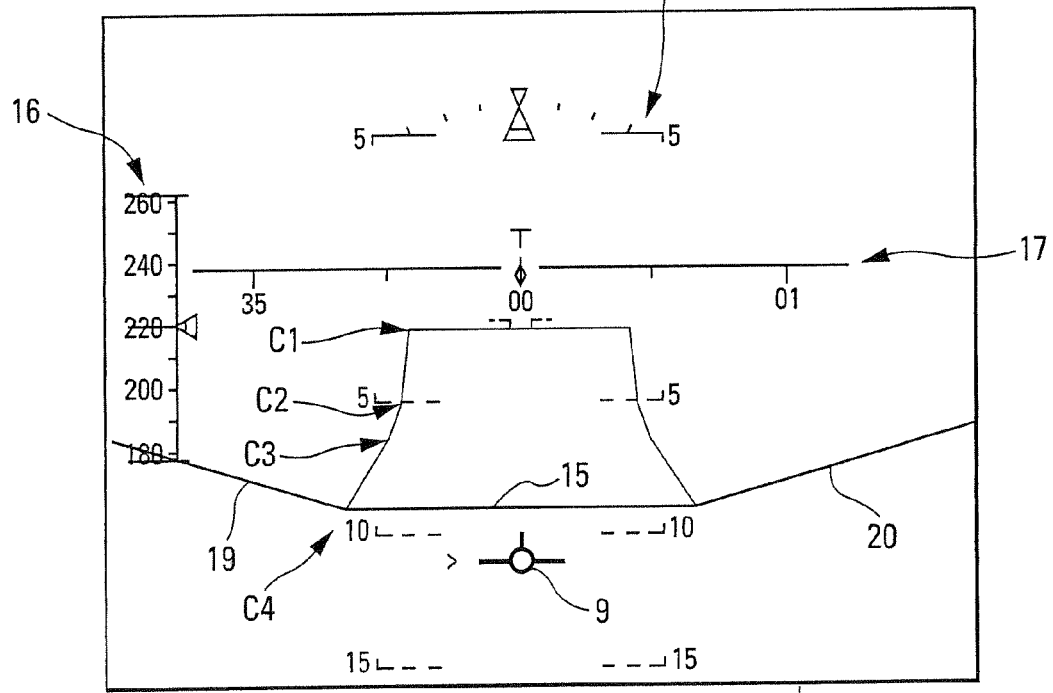

FIGS. 7 and 8 illustrate the same type of display as that of FIG. 6, but for different situations of the aircraft A relative to the flight path TV1. In the situation of FIG. 7, the aircraft A is located above the flight path TV1 (the symbol 9 is therefore displayed above the auxiliary symbol 15 of the characteristic sign C4) and it does not follow the same gradient (which is revealed by the lines 19 and 20 of said characteristic sign C4), and in the situation of FIG. 8, the aircraft A is located below said path TV1 (the symbol 9 is therefore displayed below the auxiliary symbol 15) and it does not follow the same gradient (which is again revealed by said lines 19 and 20). As for FIG. 9, it illustrates a simplified display (with horizontal lines relating to the signs C1, C2 and C3 deleted), representative of a situation similar to that of FIG. 8.

Figure 10A:
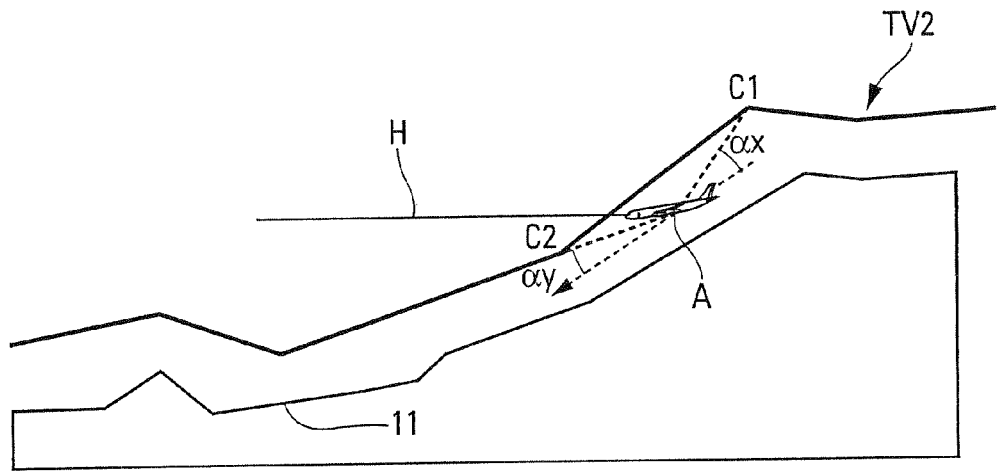
FIGS. 10A, 10B and 10C explain the method of determining a particular characteristic sign which is displayed on a display screen.
Figure 10B:
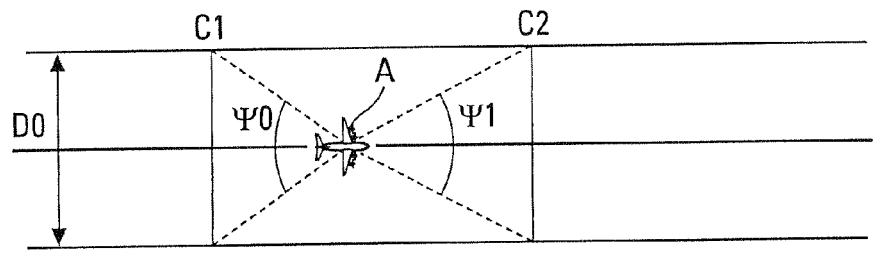
Figure 10C:
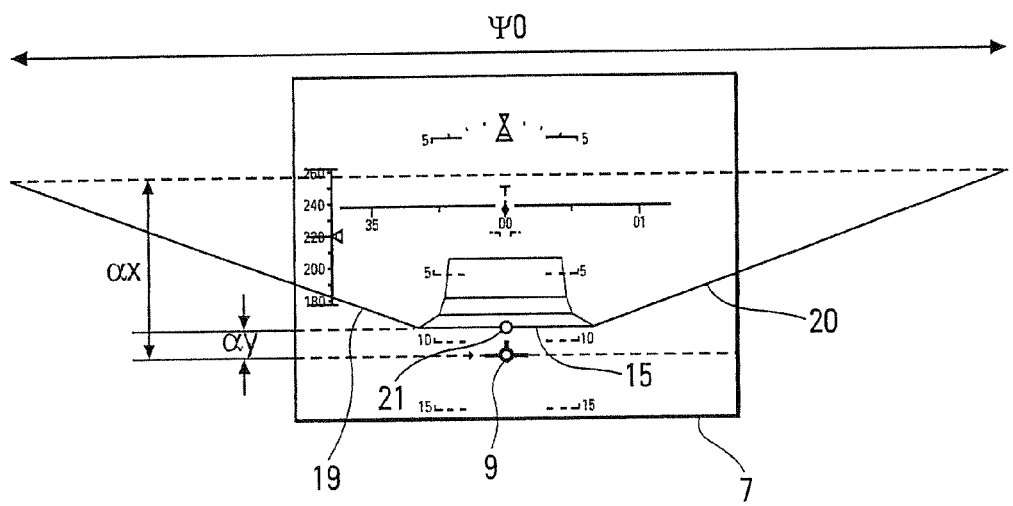

Moreover, figurers 10A, 10B and 10C comprise three superimposed graphs illustrating the same situation and respectively representing a view of the aircraft A in a vertical plane, a view of the aircraft on a horizontal plane, and the corresponding display screen 7. These figures make it possible to explain the positioning of the lines 19 and 20 of the characteristic sign C4. The angles are determined from a width DO of the plane of the flight path. This width DO is a constant which is adapted to the display provided on the display screen 7. Knowing C1 and C2 (the set-point path being known), and the position of the aircraft A and the width DO, the angles Ψ0 and Ψ1 (FIG. 10B), then αx and αy (FIG. 10C) are deduced from this according to the same generic principle described above.

Moreover, to even further facilitate the piloting of the aircraft A, the device 1 according to the invention determines, automatically and repetitively, the set-point gradient of the aircraft A (along which said aircraft A must fly), and the display device 5 presents, on said display screen 7, an auxiliary symbol 21 (represented in FIG. 10C) which is positioned on said gradient scale 8 at said set-point gradient, and more specifically in the position where the gradient symbol 9 is located if the aircraft A flies according to said set-point gradient. Consequently, in manual mode, it is sufficient for the pilot to pilot the aircraft A in such a way as to bring said gradient symbol 9 (illustrating the current gradient θ of the aircraft A) to said auxiliary symbol 21 to achieve piloting according to the flight set-points. This auxiliary symbol 21 therefore shows the point on the ground that the aircraft A would reach if it were to follow the set-point gradient.

Furthermore, said device 1 also determines, automatically and repetitively, the distance or the flight time between the current position of the aircraft A and the position of the next change of gradient, and the display device 5 presents, on the display screen 7, a particular indication means 22 indicating this distance or this flight time. This enables the pilot to anticipate the next change of gradient (that is, the next change of rectilinear segment).

Figure 11:
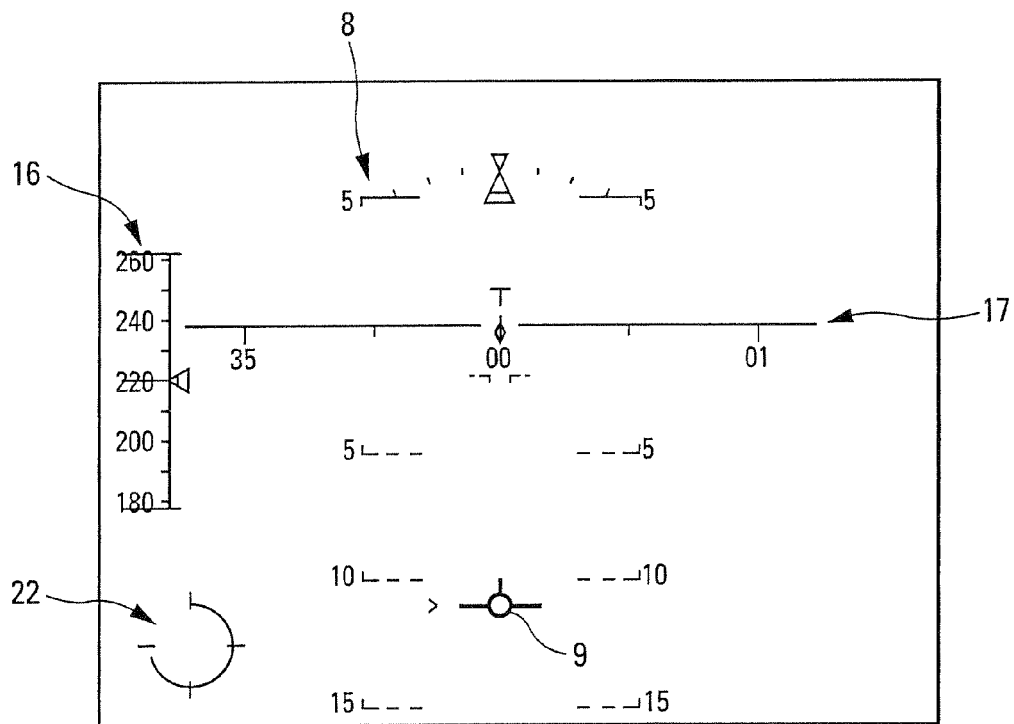
FIGS. 11 and 12 show head-up display screens presenting particular characteristics of the present invention.

In a particular embodiment represented in FIG. 11, said indication means 22 represents a circle (of variable aperture) that is therefore more or less closed. The completely closed circle corresponds to the length of the current set-point gradient segment. It is cleared when the aircraft A approaches the next change of gradient. At the transition of this change of gradient, it is clear, and it is then immediately reinitialized closed. Before the first change of gradient, said circle is displayed initialized closed, for example at the transition of the decision height HD or at a predetermined distance from said first change of gradient.

Figure 12:
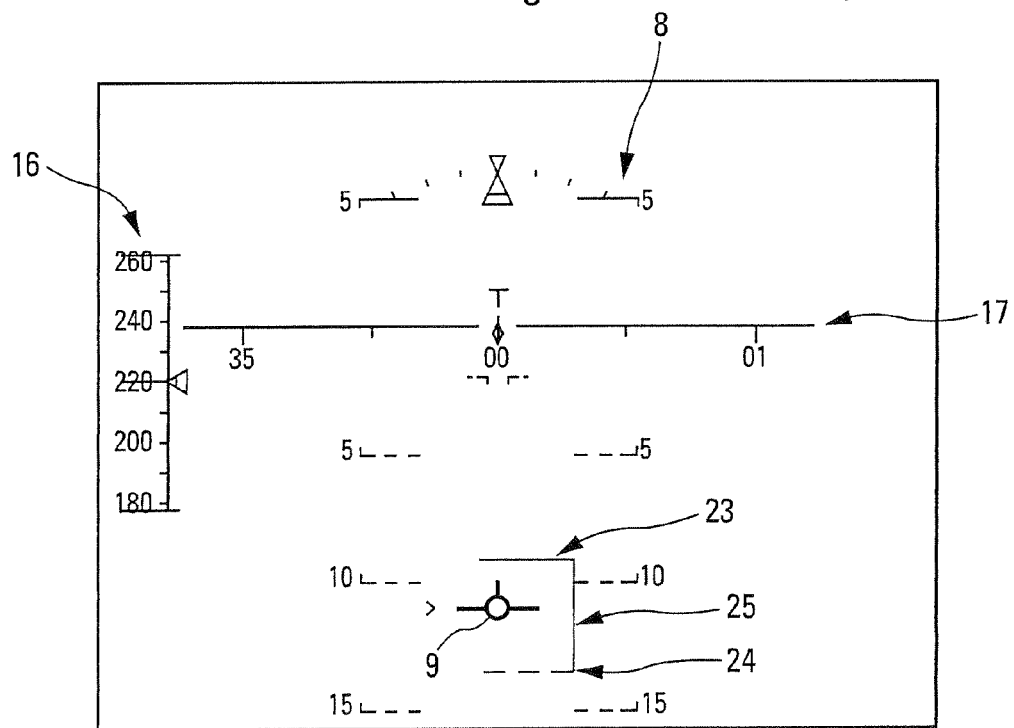

Moreover, FIG. 12 presents an alternative display with a characteristic sign 23 shown as a solid line for the current set-point gradient and a characteristic sign 24 shown as a broken line for the next set-point gradient (after the next change of gradient). These characteristic signs 23 and 24 can be linked together by a line 25. Thus, when the aircraft A goes on to the next gradient, the broken line becomes solid, and the next gradient is once again represented by a broken line. When the aircraft A follows the requested gradients, the two characteristic signs converge at the change of gradient. Thus, when the indication (characteristic sign 24) relating to the next gradient rises, the pilot must pull on the control column of the aircraft A at the level of the change of gradient so as to remain above. On the final gradient, just one indication is presented and, by definition, it aims for the point of impact on the landing strip 10.

The invention claimed is:

1. A method for assisting in the piloting of an aircraft in a flight along a flight path comprising a plurality of successive rectilinear segments, each of said rectilinear segments presenting a particular constant gradient and the gradients being different from one segment to another, whereby there is presented on a display screen of a head-up display device and superimposed on the environment seen at the front of the aircraft in conformal projection a gradient scale and, on this gradient scale, a gradient symbol illustrating the current gradient of the aircraft, wherein the following series of successive steps is carried out automatically and repetitively:
  a) determining the respective gradients of a plurality of successive rectilinear segments of said flight path and change information that makes it possible to determine changes of gradient;
  b) determining, from said gradients and from said change information, for each of said rectilinear segments, a characteristic angle which represents the gradient angle by which the corresponding rectilinear segment is seen by the pilot of the aircraft, from the current position of said aircraft; and
  c) presenting, on said display screen of the head-up display device, superimposed on the environment seen at the front of the aircraft and in conformal projection, characteristic signs which respectively depend on said characteristic angles and which are positioned on the gradient scale so as to display differences in gradient relative to said gradient symbol, each duly displayed difference in gradient presenting on the gradient scale a gradient that is equal to the corresponding characteristic angle determined in the step b).

2. The method as claimed in claim 1, wherein, in the step a), said gradients are determined at least using a performance model.

3. The method as claimed in claim 1, wherein there is determined, automatically and repetitively, a difference in gradient between an auxiliary gradient corresponding to the gradient on which the aircraft is relative to the next change of gradient and a set-point gradient corresponding to the gradient of the rectilinear segment along which the aircraft should fly, and this difference in gradient is taken into account for determining said characteristic angles.

4. The method as claimed in claim 1, wherein there is determined, automatically and repetitively, information on the distance between the current position of the aircraft and the position of the next change of gradient, and, in the step c), there is presented, on said display screen, a particular indicator that indicates this information.

5. The method as claimed in claim 1, wherein there is determined, automatically and repetitively, a set-point gradient of the aircraft, and, in the step c), there is presented, on said display screen, an auxiliary symbol which is positioned on said gradient scale at said set-point gradient.

6. The method as claimed in claim 1, wherein said flight path is a steep-gradient approach path with a view to landing on a landing strip, and said rectilinear segments represent all the successive segments of the flight path, starting from a predetermined height, and this to said landing strip.

7. The method as claimed in claim 6, wherein said change information corresponds respectively to the heights relative to the ground at which the changes of gradient must be made.

8. The method as claimed in claim 7, wherein, for a flight path comprising two successive rectilinear segments SA and SB of respective lengths aA and aB and respective gradients θA and θB, and change of gradient heights hA, hB and hC, there is determined, in the step b), the characteristic angle a which represents the gradient angle by which the rectilinear segment SB is seen from the aircraft located at the height hA at the start of the rectilinear segment SA, from the following expression:

$$aB^2 = aA^2 + aC^2 - 2aAaC \cos a$$

which is obtained from the following expressions:

$$\begin{cases} aA = (hA - hB)/\sin\theta A \\ aB = (hB - hC)/\sin\theta B \\ aC^2 = aA^2 + aB^2 - 2aAaB\cos\beta \\ \beta = \pi - \theta A + \theta B \end{cases}$$

9. The method as claimed in claim 1, wherein said flight path is a low-altitude flight path, and said rectilinear segments are all the successive segments of said flight path, which are located in front of the aircraft, and this to a particular distance relative to the current position of the aircraft.

10. An aircraft, which comprises a device configured to implement the method specified under claim 1.

11. A device for assisting in the piloting of an aircraft in a flight along a flight path comprising a plurality of successive rectilinear segments, each of said rectilinear segments presenting a particular constant gradient and the gradients being different from one segment to another, said device comprising:
  a set of information sources;
  a computation unit which is linked to said set of information sources; and
  a head-up display device, which is linked to said computation unit and which is designed to present, on a display screen, superimposed on the environment seen at the front of the aircraft and in conformal projection, a gradient scale and, on this gradient scale, a gradient symbol illustrating the current gradient of the aircraft, wherein: said device also comprises:

a gradient determining section that determines automatically and repetitively, the respective gradients of a plurality of successive rectilinear segments of said flight path, and change information that makes it possible to determine changes of gradient; and a characteristic angle determining section that determines, automatically and repetitively, from said gradients and from said change information, for each of said rectilinear segments, a characteristic angle which represents the gradient angle by which the corresponding rectilinear segment is seen by the pilot of the aircraft, from the current position of said aircraft; and said head-up display device is configured to present on said display screen, superimposed on the environment seen at the front of the aircraft and in conformal projection, characteristic signs which respectively depend on said characteristic angles and which are positioned on the gradient scale so as to display differences in gradient relative to said gradient symbol, each duly displayed difference in gradient presenting on the gradient scale a gradient that is equal to the corresponding characteristic angle determined by said characteristic angle determining section.

12. An aircraft, which comprises a device as specified under claim 11.

13. A method for assisting in the piloting of an aircraft in a flight along a flight path comprising a plurality of successive rectilinear segments, each of said rectilinear segments presenting a particular constant gradient and the gradients being different from one segment to another, whereby there is presented on a display screen of a head-up display device and superimposed on the environment seen at the front of the aircraft in conformal projection a gradient scale and, on this gradient scale, a gradient symbol illustrating the current gradient of the aircraft, wherein the following series of successive steps is carried out automatically and repetitively:

a) determining the respective gradients of a plurality of successive rectilinear segments of said flight path and change information that makes it possible to determine changes of gradient;

b) determining, from said gradients and from said change information, for each of said rectilinear segments, a characteristic angle which represents the gradient angle by which the corresponding rectilinear segment is seen by the pilot of the aircraft, from the current position of said aircraft; and c) presenting, on said display screen of the head-up display device, superimposed on the environment seen at the front of the aircraft and in conformal projection, characteristic signs which respectively depend on said characteristic angles and which are positioned on the gradient scale so as to display differences in gradient relative to said gradient symbol, each duly displayed difference in gradient presenting on the gradient scale a gradient that is equal to the corresponding characteristic angle determined in the step b), wherein:

for a flight path comprising two successive rectilinear segments SA and SB of respective lengths aA and aB and respective gradients θA and θB, and change of gradient heights hA, hB and hC, there is determined, in the step b), the characteristic angle a which represents the gradient angle by which the rectilinear segment SB is seen from the aircraft located at the height hA at the start of the rectilinear segment SA, from the following expression:

$$aB^2 = aA^2 + aC^2 - 2aAaC \cos a$$

which is obtained from the following expressions:

$$\begin{cases} aA = (hA - hB)/\sin\theta A \\ aB = (hB - hC)/\sin\theta B \\ aC^2 = aA^2 + aB^2 - 2aAaB \cos\beta \\ \beta = \pi - \theta A + \theta B. \end{cases}$$

* * * * *